United States Patent [19]
Bishop

[11] 3,842,537
[45] Oct. 22, 1974

[54] PLANT GROWTH COMPOSITION AND STRUCTURE

[76] Inventor: Virgil M. Bishop, c/o Bishop Floral Co. P.O. Box 728, Alexander City, Ala. 35010

[22] Filed: Oct. 19, 1973

[21] Appl. No.: 407,788

[52] U.S. Cl............ 47/37, 71/25, 264/154, 264/330, 47/34
[51] Int. Cl............................................ A01g 9/02
[58] Field of Search........................ 71/23–25, 64; 47/37, 34, 1, 1.2; 264/154, 330–331

[56] References Cited
UNITED STATES PATENTS

| | | | |
|---|---|---|---|
| 2,094,513 | 9/1937 | Wilson et al.............. | 47/34 |
| 2,202,664 | 5/1940 | Leatherman.............. | 47/37 |
| 2,700,847 | 2/1955 | Brasol...................... | 47/34 |
| 2,728,169 | 12/1955 | Spengler et al........... | 47/37 |
| 2,785,969 | 3/1957 | Clawson.................. | 71/64 |
| 2,858,647 | 11/1958 | Cotton..................... | 47/37 |
| 3,102,364 | 9/1963 | Pullen...................... | 47/37 |
| 3,467,609 | 9/1969 | Adams et al.............. | 47/1.2 |
| 3,534,497 | 10/1970 | Hornbostel............... | 47/37 |

FOREIGN PATENTS OR APPLICATIONS

| | | |
|---|---|---|
| 179,055 | 5/1922 | Great Britain |
| 195,263 | 3/1923 | Great Britain |

*Primary Examiner*—Robert E. Bagwill

[57] ABSTRACT

In a preferred embodiment of the invention, a solid shaped growth medium of adhered particulate coconut-husk pulp and severed coconut-husk fibers, and water-soluble adhesive adhering the mass together in a predetermined shape including plant-insertion holes and water-insertion holes in an upper surface of typically a flower-pot shaped structure, and the process of making the composition and the preferred shaped structure of adhered mixture which preferably includes the particulating of the pulp into particle form and grading the same into typically particles of less than one-sixteenth inch diameter and particles of more than one-sixteenth inch ranging up to one-fourth inch, and grading the fibers and employing the fibers ranging from one-fourth inch to 3 inches, admixing these selected groups in a 1:1:1 weight ratio, and thereafter preparing and absorbing into the pulp-fiber mixture water-soluble adhesive by subjecting the pulp-fiber mixture to a solution of the adhesive, and shaping the adhesive-containing mixture into a flower-pot shape with the plant-insertion and the water-insertion holes in the upper surface being formed, and thereafter drying the shaped holes-containing pot into a dry solid state.

10 Claims, 4 Drawing Figures

PLANT GROWTH COMPOSITION AND STRUCTURE

The present invention relates to a plant growth medium and articles formed therefrom.

BACKGROUND TO THE INVENTION DISCLOSURE

Prior to the present invention, there have been many different kinds of growth mediums, and characteristically a growth medium of prior types is merely a combination of natural occurring components which when added to normal soil or filler serves hopefully to enhance growth of a particular type of plant life. For the composition of the present invention utilizing up to 100 percent coconut-husk, unprocessed coconut-husk is inoperative as a growth medium as compared to the processed coconut-husk of the present invention, as well as the fact that coconut husk can be either or both the pulp thereof utilized alone or the fibers thereof utilized alone or a mixture of pulp and fibers, the use of the pulp alone or of the fibers alone being also inoperative for the present invention. Accordingly, not only does the present invention require a particular combination of a material which in an unprocessed state does not function as a growth medium, but additionally in contrast to prior mediums there is no requirement to add other ingredients thereto for normal plant life to abound by the present invention. Also, prior to the present invention, there remained the basic conventional requirement of a vessel for the plant and for the growth medium, which is not a requisite of the present invention. Moreover, prior to the present invention, the present one or more ingredients have not been utilized as a part of a plant growth composition.

BROAD DESCRIPTION OF THE INVENTION

Accordingly, objects of the present invention include the obtaining of the advantages and avoiding of the difficulties and disadvantages and requirements of prior plant growth mediums, as discussed above.

Another object of the invention is to obtain a novel growth medium composition for plants.

Another object of the invention is to obtain novel articles and novel advantages employing the novel growth medium composition.

Another object is to obtain a process of making the novel growth medium composition for plants, and further a more detailed process of using that composition in the manufacture of novel articles having novel advantages.

Broadly the invention includes a combination of normally non-growth substances which when processed and admixed becomes a growth medium for plants having valuable growth-enhancement properties together with other advantages, and advantageously retain these advantageous properties when constituted into a solid shape and form which includes a water-soluble adhesive which adhesive is by the process distributed through-out the admixed composition.

In greater particularity, coconut husk is composed of two separate parts, the fibers of the husk which provide strength, rigidity and protection of the pulp of the husk, and second the pulp of the husk which pulp during growing season retains and provides moisture for the nut as well as protection to the nut itself. Although it clearly is possible to include other ingredients which themselve cannot be inconsistent with the spirit of the invention, it is possible for the admixture of husk ingredients of the present invention as process to function as 100 percent coconut husk, without any other additives or soil or the like, the plant being deposited or planted directly into this novel composition.

By the process of the invention, the coconut-husk pulp is chopped or otherwise ground or particulated into particulate form, and the long fibers characteristic of coconut husk are severed or otherwise cut or divided into shorter lengths (encompassed within the term "severing") and the particulated pulp and the severed fibers are admixed in proportion typically ranging from 1:2 to 2:1 by weight, but preferably in about 1:1 ratio by weight, of smaller particles to larger particles of the pulp and in about one part by weight of fibers per one part by weight of the smaller particles or per one part by weight of the larger particles, such that a typical preferred composition of small particles of pulp, and of large particles of pulp, and of the fibers is by weight about 1:1:1. The smaller particles are preferably substantially smaller than one-sixteenth inch and the larger particles are preferably substantially larger than one-sixteenth inch up to about one-quarter inch for the pulp, and the fibers employed range in lengths from about one-quarter inch to 3 inches in length the particle size being in terms of particle diameter.

In another form of the invention, without loss of the growth-promoting properties, water-soluble adhesive is absorbed into the mixture of pulp particles and severed particles from a solution of the adhesive in water, to be formed into a solid shaped mass which itself continues to provide the growth media while concurrently obviating the necessity of a vessel for the containment of the growth media and/or the plant(s) to be grown therein, as well as preferably having plant-insertion hole(s) and preferably separate water-insertion hole(s) provided in the upper surface thereof extending downwardly in the nature of closed-bottom vessels.

As a part of the process, adhesive of water-soluble characteristics is dissolved in water in concentration providing a high degree of adherence when admixed with solid dry particulates, and is admixed with or otherwise absorbed to the mixture of the pulp particles and the severed fibers, shaped into any desired predetermined shape providing an insertion hole therein preferably, and thereafter dried into a solid dry self-supporting structure.

Thus the outer-most part of the coconut, namely the husk is by this invention by the process(es) noted above formed into a novel growth composition which is thereafter preferably formed into novel growth-promoting articles for the growth of plant life of the type that one plants in a growth medium normally, or into soil with or with conventional growth medium, the present invention requiring neither soil nor supplemental growth medium.

Some of the resulting advantages of the present invention include: the possible total replacement of soil as a growing medium; the possible elimination of soil mixtures, and/or of soil additives, and/or of soil conditions adverse or not, and/or of soil aeration materials; the avoiding of the need for separate vessel(s) for the growing medium and/or the plant to be planted, together with other advantages apparent from the preceding and following disclosure. For example the medium whether with or without the adhesive in the loosely mixed state and/or in the solid state (as adhered by the water-soluble adhesive) provides excellent rooting medium as well as growing medium. The process mixture, referred-to by the inventor as carib-peat, as processed absorbs water at a rapid rate and retains moisture within the pulp cellular structure, the unprocessed pulp not possessing this physical characterisitic — as note above previously. Carib-peat does not become water-logged through over-watering thereby avoiding possible compaction and avoiding possible restriction of root growth, while concurrently there is the ability to absorb moisture and nutrients that may be added. The carib-peat is sterile and free of insects, diseases, and plant life any one of which if present could constitute problem(s) characterisitic of prior growth mediums and/or earth (soil). Carib-peat is not detrimental to most common forms of plant life, and the adhesive of a water-soluble nature — which may be any starch or other conventional water-soluble adhesive — does not have any adverse effect on root growth. The carib-peat provides excellent aeration for root growth, and retains nutrients that are provided to the plant either in liquid or dry forms. The carib-peat is consistent as a growing medium at the beginning of each crop of plants, and possesses the physical ability to retain moisture longer than soil and soil mixture under identical growing conditions. Typical molded sizes range from about 2½ inch to 3 inches in diameter and as noted above have the ability to replace the needed pot.

THE FIGURES

DETAILED DESCRIPTION OF THE INVENTION

Figure 1:
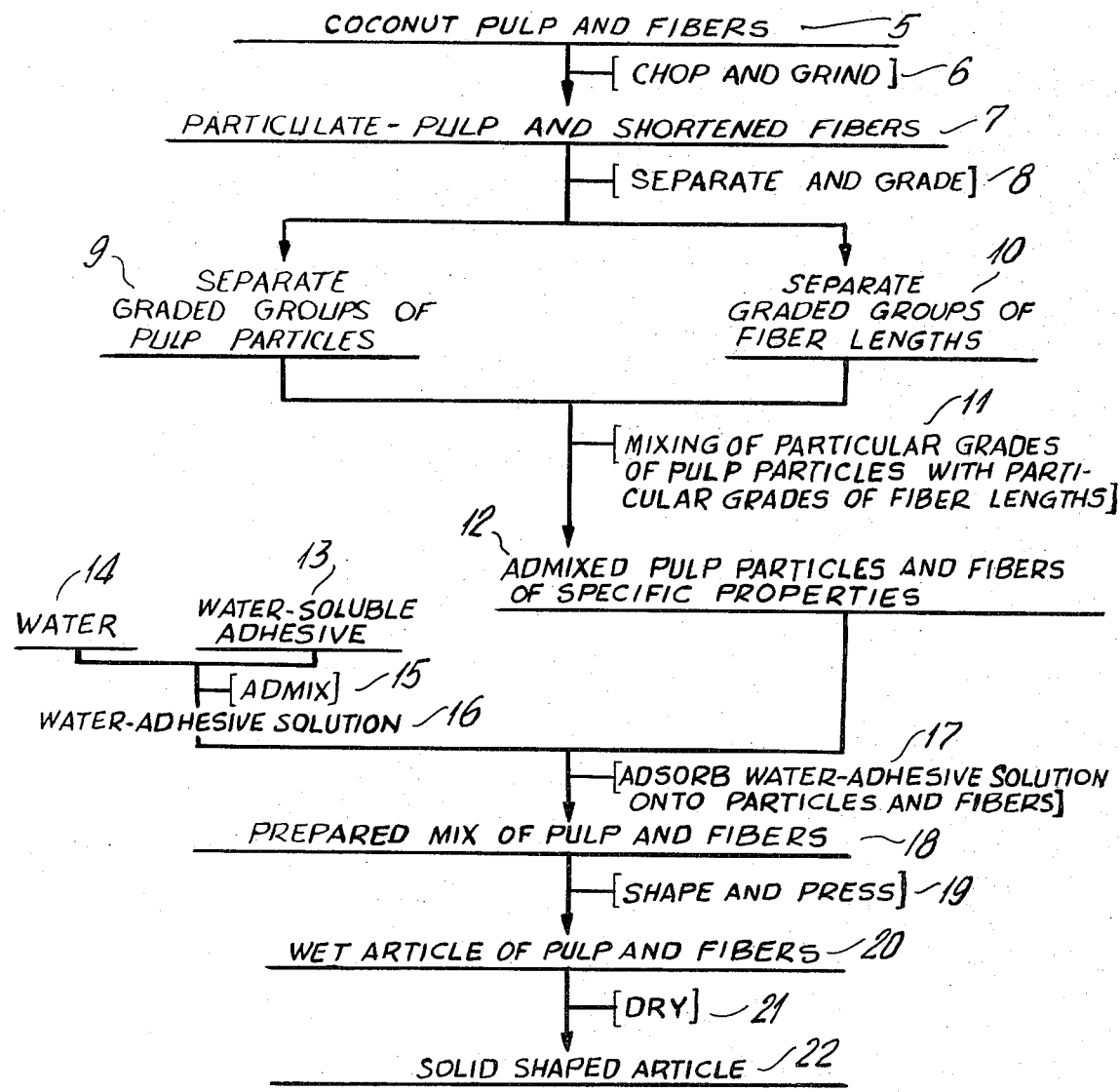
FIG. 1 illustrates in diagrammatic graphic form a flow series of a preferred embodiment of the process(es) of the present invention.

With particular reference to FIG. 1, coconut husk pulp and fibers 5 are subjected to appropriate chopping and grinding step(s) 6 to produce a particulate pulp and shortened fibers jointly designated 7 but which preferably are separately chopped and ground and in any event are separated from one-another in the particulated and severed-fiber states and each graded, the grading step(s) being designated as step 8, into the particle sizes (the particle diameters) set-forth previously above, and the fiber length range set-forth previously above, after which the select pulp particles 9 and the select fibers 10 are admixed in predetermined ratio by weight to render an admixture 12 from the mixing step 11, after which water 14 is admixed with water-soluble adhesive 13 by admixing step 15, after which the water-adhesive solution 16 is absorbed into the admixture 12 by step 17 to result in a wet mix of pulp particles, severed fibers, and water-dissolved adhesive film and/or content (absorbed into cellular structure) cumulatively designated as the prepared mix 18 which thereafter is shaped and preferably pressed as step(s) 19 to produce the wet shaped article 20 which thereafter is dried 21 to result in the finished article 22 which is solid and dry.

Figures 2, 3, 4:
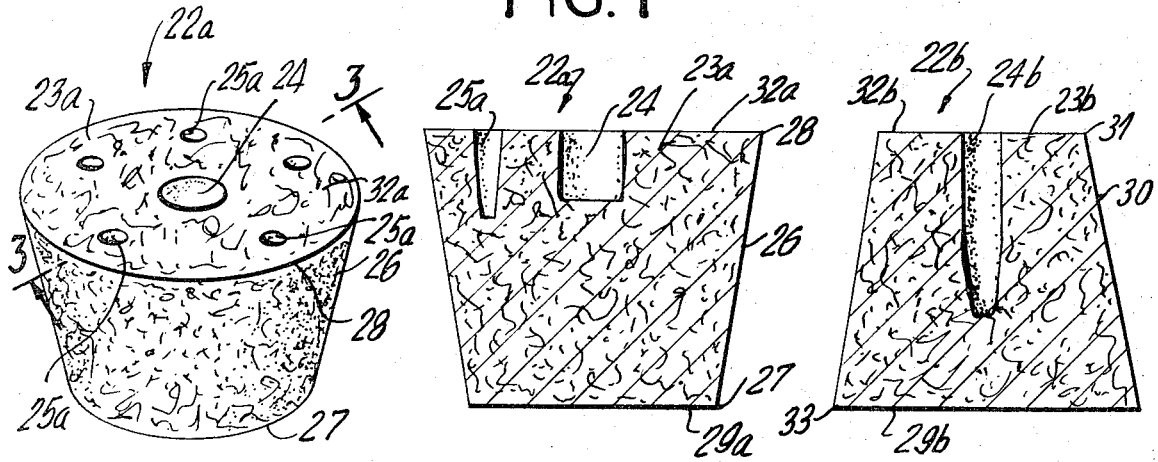
FIG. 2 illustrates a typical and preferred pot-shaped solid-state growth-medium article of the invention in side perspective view.
FIG. 3 illustrates a side cross-sectional view as taken along lines 3—3 of FIG. 2, through a plant-insert central hole and through an edge positioned water-insert hole, both holes in the upper surface thereof.
FIG. 4 illustrates an alternative typical shape of inverted shape in side cross-sectional view as compared to FIG. 3 embodiment.

The FIG. 2 typically illustrates such an article 22a which requires no vessel-container therefor, having solid composition 23a shaped with base 27 and narrowing-downwardly sides 26 and rounded periphery 28 of the top 32a which top surface has insert central planting hole 24 and water-holes 25a. The bottom face 29 is flat to serve to uprightly support the structure 22a, shown in FIG. 3 in side cross-sectional view. FIG. 3 embodiment has a narrowed upper periphery and larger base for better stability uprightly, but otherwise corresponds to FIG. 3 as to designations 32b top, vessel 22b, hole 24b, and the like, with slanted side 30.

It is within the scope and spirit of the present invention to make such variations and modifications as would be apparent to a person of ordinary skill in this art, including obvious substitution of equivalents.

I claim:

1. A growth composition comprising in combination: coconut-husk pulp in particulate form, and severed coconut-husk fibers, the pulp being of two predetermined particle size ranges and the fibers being severed and of predetermined fiber length, and the pulp and fibers being admixed with one another.

2. The growth composition of claim 1, in which the two separate predetermined ranges include a first group of particles of cross-sectional diameters less than one-sixteenth inch, and a second group of particles of cross-sectional diameters of more than one-sixteenth inch ranging up to about one-quarter inch, the first group being present in a predetermined first percentage by weight of the composition, and the second group being present in a predetermined second percentage by weight of the composition and ratio to the first group, and the fibers being present in a predetermined percentage by weight of the composition and ratio to the first group and to the second group each respectively, the ratios being by weight.

3. The growth composition of claim 2, in which the ratio of the second group to the first group is 1:1 and of the fibers to the first group is 1:1, in which fibers range from one-quarter inch to 3 inches.

4. A molded growth structure comprising in combination: molded into a predetermined stably-fixed shape, a composition in a dried state comprising water-soluble adhesive, coconut-husk pulp in particulate form, said pulp being present in two predetermined particle size ranges, and severed coconut-husk fibers, the pulp fibers being admixed with one-another, and the water-soluble adhesive being distributed throughout the mixed pulp and fibers in an absorbed state characterized by absorption of the water-soluble adhesive in a water solution thereof by the admixed pulp and fibers.

5. A molded growth structure of claim 4, a first group of the two pulp particle size ranges including particles of less than one-sixteenth inch in diameter, and a second group of more than one-sixteenth inch up to one-quarter inch, and in which fiber lengths range from about one-quarter inch to about 3 inches.

6. A process comprising in combination: particulating coconut-husk pulp into particulate form, in two separate, predetermined particle size ranges, severing and grading coconut-husk fibers to a predetermined length, and admixing the particulate pulp and the severed fibers.

7. A process of claim 6, including admixing water and water-soluble adhesive together to form a solution thereof, and admixing the solution with the admixed pulp and fibers in a solution amount for the water-soluble adhesive to be absorbed throughout the admixture of pulp and fibers.

8. A process of claim 7, including shaping the admixture after the adhesive solution has been absorbed thereinto, into a predetermined shape, and drying the shaped adhesive-containing admixture.

9. A process of claim 8, including forming downwardly extending hole-depression in an upper surface of the shaped admixture such that a plant is downwardly insertable thereinto.

10. A process of claim 9, including forming an additional downwardly extending hole-depression in an uppersurface of the shaped admixture such that a quantity of water may be poured thereinto.

* * * * *